United States Patent Office 2,768,208
Patented Oct. 23, 1956

2,768,208

N,N' SUBSTITUTED DIETHYL p-PHENYLENE DIAMINE ANTIOXIDANTS

Charles John Pedersen, Salem, N. J., assignor to E. I. du Pont de Nemours and Company, Wilmington, Del., a corporation of Delaware No Drawing. Application May 25, 1954,
Serial No. 432,309

6 Claims. (Cl. 260—570.5)

This invention relates to nitrogen bases, and more particularly to N,N'-dialkyl-para-phenylene diamines in which the alkyl groups are tertiary alkyl groups and each has attached thereto a primary amino group. These compounds have the general formula:

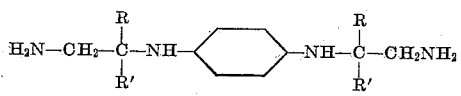

in which R and R' are lower alkyl groups containing 1 to 4 carbon atoms.

The compounds of this invention are particularly useful as antioxidants for fuels such as gasolines, lubricating oils, and for natural and synthetic elastomers. They are also useful as polymerization inhibitors, particularly in the preparation and storage of ethylenic compounds such as styrene and auto-oxidizable substances such as benzaldehyde, etc.

Organic amines, particularly when the amine groups are primary or secondary in nature, enter into a variety of chemical reactions and are useful in the synthesis of other organic compounds. They may be used as intermediates for the preparation of more complicated nitrogen compounds, or for the preparation of compounds wherein the amino group is replaced by other structures.

It is an object of the present invention to produce new and useful amino compounds which carry both primary and secondary amino groups and which, due to the particular nuclear structure, exhibit effectiveness as antioxidants and polymerization inhibitors. Another object of the invention is to provide a method for producing these new amino-substituted N,N'-dialkyl-para-phenylene diamines.

The compounds of the present invention may be produced by reduction of the corresponding nitriles or amides such as alpha, alpha'-(para-phenylenediimino)-diisobutyronitrile of the formula:

$$NC-\underset{\underset{CH_3}{|}}{\overset{\overset{CH_3}{|}}{C}}-NH-C_6H_4-NH-\underset{\underset{CH_3}{|}}{\overset{\overset{CH_3}{|}}{C}}-CN \quad (1)$$

or from the corresponding diisobutyramide of the formula:

$$H_2NCO-\underset{\underset{CH_3}{|}}{\overset{\overset{CH_3}{|}}{C}}-NH-C_6H_4-NH-\underset{\underset{CH_3}{|}}{\overset{\overset{CH_3}{|}}{C}}-CONH_2$$

or homologous nitriles or amides, which, as the nitrile, have the formula:

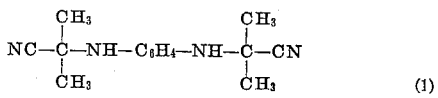

(2)

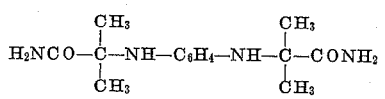

(3)

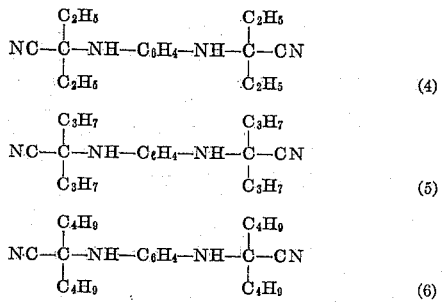

The nitriles of the above formulae may be prepared by condensing para-phenylene diamine with hydrocyanic acid and the ketone. The amides may be made from the nitrile by conventional methods.

The reaction of the para-phenylene diamine with the hydrocyanic acid and acetone or other ketone of the class mentioned is carried out by the process more particularly described by Bukhsh in J. Chem. Soc. (London) p. 1159 (1936), who discloses the reaction of aniline with cyclohexanone and hydrocyanic acid in glacial acetic acid. The reaction normally takes place at ordinary room temperatures.

The ketones used in producing the nitriles of the above formulae are (1) acetone, (2) methylethyl ketone, (3) methylbutyl ketone, (4) diethyl ketone, (5) dipropyl ketone, and (6) dibutyl ketone.

The reduction of the nitriles or the amides is preferably carried out with lithium aluminum hydride in an inert solvent, which solvent should be anhydrous and free from hydroxyl or readily reducible groups. Diethyl ether, dioxane and tetrahydrofurane are illustrative of the types of solvents which may be employed. The reduction is preferably carried out at temperatures of from 0° to 50° C.

The following examples are given to illustrate the invention. The parts used are by weight.

Example 1

Ten (10) parts of lithium aluminum hydride were stirred with 350 parts of anhydrous diethyl ether under reflux. To this solution were added 24.2 parts of alpha,alpha'-(para-phenylenediamino)-diisobutyronitrile slurried in 210 parts of the anyhydrous ether. Stirring with reflux was continued for 24 hours. The reaction mass was then cooled to 0° C. and 14.5 parts of water were added, followed by 14.6 parts of 20% sodium hydroxide solution and 50 parts more water. All operations up to this point were carried out under nitrogen. Evaporation of the ether solution under vacuum gave a red-brown sticky solid from which the pure bis(aminotertiarybutyl)para-phenylenediamine was obtained by recrystallizing twice from isooctane. Its properties are summarized at the end of Example 2.

Example 2

Similarly, 11.5 parts of lithium aluminum hydride and 17 parts of N,N'-bis(2-carbamylisopropyl)-para-phenylenediamine, that is, alpha,alpha'-para-phenylenediimino diisobutyroamide, were agitated and refluxed 18 hours in a total of 450 parts of diethyl ether under nitrogen. The charge was then treated with 60 parts of water during 90 minutes, agitated 1 hour more, and filtered. The solid residue was washed with three 70 part portions of diethyl ether. The combined ether solutions were evaporated under vacuum and residue crystallized twice from isooctane. The bis(aminotertiarybutyl)-para-phenylenediamine was thus obtained as pale buff-colored crystals melting at from 106° to 107° C. It contained the theoretical quantity of nitrogen (22.4%), and, when titrated with standard hydrochloric acid using Methyl Red as an indicator, neutralized 2 mols of the monobasic acid per mol of nitrogen base, the two amino groups directly attached to the benzene ring not being affected under these conditions.

Any of the nitriles formulated above may be substituted for the alpha,alpha'-(para-phenylenediamino)-diisobutyronitrile of Example 1 to produce the corresponding diamino-substituted compounds. In the same manner, the amides corresponding to the nitriles formulated above may be substituted in the process of Example 2 to produce identical compounds.

As mentioned above, this class of compounds is of particular value as antioxidants and as polymerization inhibitors. The following examples illustrates their use as antioxidants.

*Example 3*

In order to illustrate the outstanding effectiveness of the compounds of the present invention as antioxidants, the N,N' - bis(aminotertiarybutyl) - para - phenylenediamine made in the preceding examples was tested in a leaded gasoline by ASTM method D522–46, which determines, as a measure of the susceptibility of the gasoline to oxidation, the length of the induction period before oxygen absorption by the gasoline begins, under controlled experimental conditions. The following table gives the induction periods for the gasoline without antioxidant and with the compound of Examples 1 and 2, and, for further comparison, with a very effective commercial gasoline antioxidant, N,N' - di - (secondary-butyl)-para-phenylenediamine. Both antioxidants were used in a concentration of 0.0019% by weight. The efficiency (increase in induction period expressed as percentage of the increase obtained with the antioxidant standard) is given on both a weight and a molar basis.

| Antioxidant | Induction Period, minutes | Efficiency | |
|---|---|---|---|
| | | Weight, percent | Molar, percent |
| None | 213 | | |
| Commercial Antioxidant | 413 | 100 | 100 |
| Compound of Examples | 605 | 196 | 223 |

Thus, the compound of the present invention is roughly twice as efficient in gasoline as the antioxidant now widely used.

I claim:
1. Compounds of the following general formula:

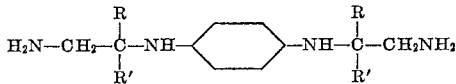

in which R and R' are lower alkyl groups containing 1 to 4 carbon atoms.

2. Compound of the formula:

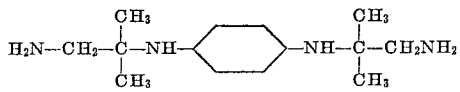

3. Compound of the formula:

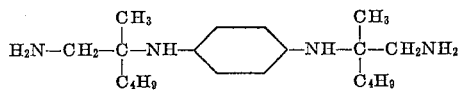

4. Compound of the formula:

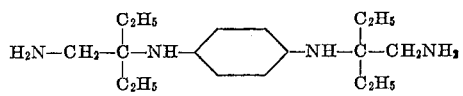

5. Compound of the formula:

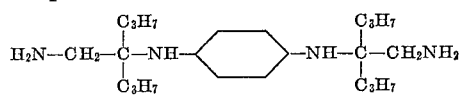

6. Compound of the formula:

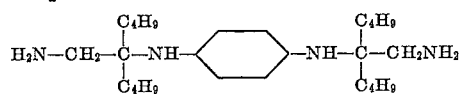

References Cited in the file of this patent
FOREIGN PATENTS
302,985    Great Britain     Dec. 24, 1928
OTHER REFERENCES
Loew et al., Chem. Abst. (1952), vol. 46, p. 8040.